(12) United States Patent
Klemen et al.

(10) Patent No.: US 6,527,659 B1
(45) Date of Patent: Mar. 4, 2003

(54) TWO-MODE INPUT-COMPOUND SPLIT ELECTROMECHANICAL TRANSMISSION FOR FRONT WHEEL DRIVE VEHICLES

(75) Inventors: Donald Klemen, Carmel, IN (US); Michael Roland Schmidt, Carmel, IN (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/963,119

(22) Filed: Sep. 24, 2001

(51) Int. Cl.[7] .............................. F16H 3/72; F16H 37/06
(52) U.S. Cl. ................................................ 475/5; 475/2
(58) Field of Search .................................. 475/2, 5, 10

(56) References Cited

U.S. PATENT DOCUMENTS

| | | | | |
|---|---|---|---|---|
| 4,260,919 A | * | 4/1981 | Fleming ...................... 310/113 |
| 5,419,406 A | * | 5/1995 | Kawamoto et al. ......... 180/65.6 |
| 5,558,588 A | * | 9/1996 | Schmidt ........................ 475/5 |
| 5,904,631 A | * | 5/1999 | Morisawa et al. ............. 475/5 |
| 5,931,757 A | | 8/1999 | Schmidt ........................ 475/2 |
| 5,935,035 A | * | 8/1999 | Schmidt ........................ 475/5 |
| 6,371,882 B1 | * | 4/2002 | Casey et al. ................... 477/5 |

\* cited by examiner

*Primary Examiner*—Sherry Estremsky
*Assistant Examiner*—Tisha D. Lewis
(74) *Attorney, Agent, or Firm*—Leslie C. Hodges

(57) ABSTRACT

An input-compound split electromechanical drive configuration includes a two-mode planetary gearset arrangement coupled to an internal combustion engine and first and second electric machines. The drive configuration includes a transverse output for driving a hybrid front wheel drive vehicle, and the electric machines are disposed on opposite axial ends of the planetary gearset arrangement. A first mode provides reverse, neutral and low forward ranges, and a second mode provides a high efficiency forward range. Shifting between the first and second modes occurs synchronously, and at a zero speed of the second machine, contributing to an exceptionally smooth shift, and the machines are independently operated in motoring or generating modes to control drivetrain power flows while satisfying the vehicle power requirements.

9 Claims, 2 Drawing Sheets

US 6,527,659 B1

TWO-MODE INPUT-COMPOUND SPLIT ELECTROMECHANICAL TRANSMISSION FOR FRONT WHEEL DRIVE VEHICLES

TECHNICAL FIELD

This invention relates to an electric hybrid drive configuration for a front wheel drive vehicle, including a two-mode, input-compound split electromechanical transmission coupled to an internal combustion engine and a pair of electric machines.

BACKGROUND OF THE INVENTION

A two-mode, input-compound split, electromechanical transmission provides an effective and efficient hybrid drive configuration for medium and heavy weight vehicles. An internal combustion engine and two electric machines are coupled to the transmission, and the machines are independently controlled to either motor or generate depending on the driving condition.

A drive configuration of the above-referenced type is shown and described in the U.S. Pat. No. 5,931,757 to Schmidt, issued on Aug. 3, 1999, and assigned to the assignee of the present invention. In that configuration, three planetary gearsets and both electric machines are coaxially aligned, and the electric machines circumscribe the planetary gearsets. Despite its many advantages, the Schmidt arrangement is not particularly amenable to front wheel drive automotive vehicles, and the circumscribing electric machine configuration tends to complicate design and assembly of the unit. Additionally, the shift point between forward speed modes occurs at non-zero speeds of both machines. Accordingly, what is desired is a two-mode input-compound split electromechanical drive configuration that is better suited to hybrid front wheel drive automotive vehicles, that is less complicated and easier to assemble, and that shifts at or near a zero speed point of at least one of the electric machines.

SUMMARY OF THE INVENTION

The present invention is directed to an improved input-compound split hybrid electromechanical drive configuration including a two-mode planetary gearset arrangement coupled to an internal combustion engine and first and second electric machines, wherein the drive configuration includes a transverse output for driving a hybrid front wheel drive vehicle, and the electric machines are disposed on opposite axial ends of the planetary gearset arrangement. A first mode provides reverse, neutral and low speed forward ranges, while a second mode provides a high speed forward range with very high efficiency and low electric power consumption. Shifting between the first and second modes occurs synchronously, and at a zero speed of the second machine, contributing to an exceptionally smooth shift. In the illustrated embodiment, the gearset arrangement includes first, second and third coupled planetary gearsets, with ring of the first gearset coupled to the planet carrier of the third gearset, the first machine coupled to sun gears of each gearset, the second machine coupled to the ring gear of the third gearset, the engine coupled to the planet carrier of the first gearset through an optional input clutch and the output coupled to the planet carrier of the second gearset. A first clutch grounds the ring gear of the second gearset during the first mode, and a second clutch couples the planet carriers of the second and third gearsets during the second mode.

DESCRIPTION OF THE PREFERRED EMBODIMENT

Figure 1:
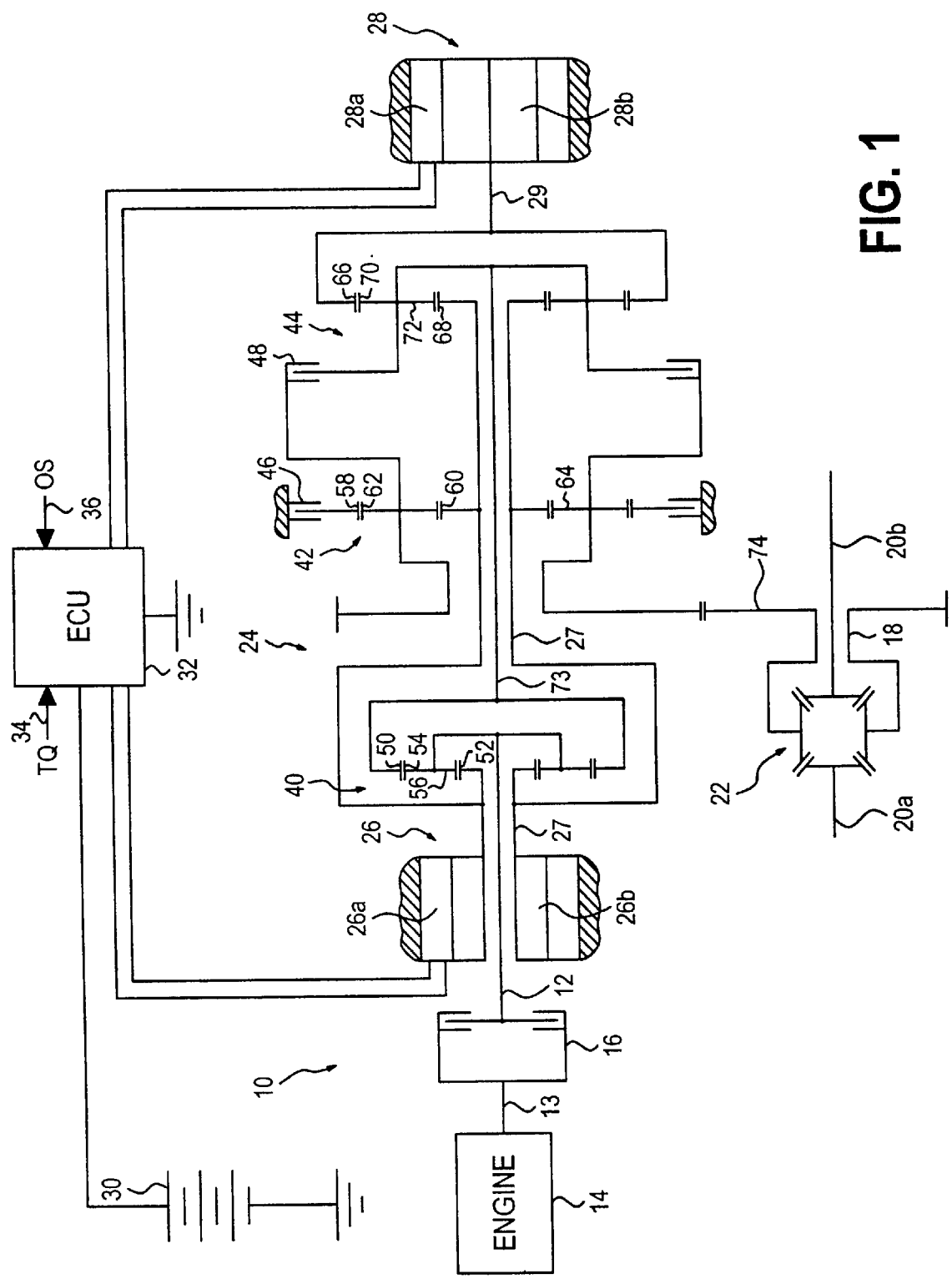
FIG. 1 is a schematic representation of one preferred form of a two-mode, input-compound split, electro-mechanical transmission embodying the concepts of the present invention.

Referring to FIG. 1, the reference numeral 10 generally designates a two-mode, input-compound split, electromechanical transmission according to this invention. The transmission 10 has an input shaft 12 coupled to the output shaft 13 of an internal combustion engine 14 via an optional input clutch 16. An output shaft 18 of transmission 10 is coupled to a pair of drive shafts 20a, 20b through a conventional differential gearset 22.

The transmission 10 includes a planetary gearing arrangement 24 and two electric machines 26, 28 coupled to gearing arrangement 24, with machines 26 and 28 being disposed at opposite axial ends of the gearing arrangement 24 as shown. A storage battery 30 is provided for supplying current to machines 26 and/or 28 when operating in a motoring mode, and receiving charging current from machines 26 and/or 28 when operating in a generating mode. An electronic control unit (ECU) 32, including a microprocessor-based controller and suitable inverter circuitry, couples the battery 30 to machines 26, 28, and controls the same in response to various input signals, including the driver torque request signal (TQ) on line 34 and the output shaft speed signal (OS) on line 36. In a preferred embodiment, the machines 26, 28 are configured as induction machines, although other configurations are also possible. Thus, machine 26 is depicted as having a fixed stator 26a electrically coupled to ECU 32 and a rotor 26b mounted on a sleeve shaft 27 of transmission 10. Similarly, machine 28 is depicted as having a fixed stator 28a electrically coupled to ECU 32 and a rotor 28b mounted on transmission shaft 29.

The gearing arrangement includes three coupled planetary gearsets 40, 42 and 44 and a pair of selectively engaged friction clutches 46, 48. In customary fashion, each planetary gearset 40, 42, 44 includes an outer (ring) gear circumscribing an inner (sun) gear, and a plurality of pinion gears rotatably mounted on a carrier such that each pinion gear meshingly engages both the outer gear and the inner gear. Thus, the gearset 40 includes a ring gear 50, a sun gear 52, and a set of pinion gears 54 mounted on a carrier 56; the gearset 42 includes a ring gear 58, a sun gear 60, and a set of pinion gears 62 mounted on a carrier 64; and the gearset 44 includes a ring gear 66, a sun gear 68, and a set of pinion gears 70 mounted on a carrier 72. As shown in FIG. 1, the carrier 64 is coupled to the output shaft 18 via output gear 74, the sun gears 52, 60 and 68 are interconnected for common rotation with electric machine 26 via sleeve shaft 27, the carrier 56 is coupled to the input shaft 12, the ring gear 66 is coupled for rotation with electric machine 28 via shaft 29, and the ring gear 50 is coupled for rotation with the carrier 72 via shaft 73. Additionally, the clutch 46 selectively couples the ring gear 58 to ground, and the clutch 48 selectively couples the carrier 64 to the carrier 72.

A first mode of operation providing Reverse, Neutral and Lo-Forward speed ranges is established by engaging clutch 46 and releasing clutch 48, and a second mode of operation providing a High-Forward speed range is established by engaging clutch 48 and releasing clutch 46. Logic for controlling engagement and disengagement of the clutches 46, 48 is performed by the ECU 32, which controls suitable solenoid-operated mechanisms (not shown) for carrying out the desired engagement states. The machines 26 and 28 are independently operated by ECU 32 in either motor or generator modes, depending on speed and load conditions, and to control the power flow among machines 26, 28, engine 14, battery 30 and output shafts 20a, 20b.

Figure 2:
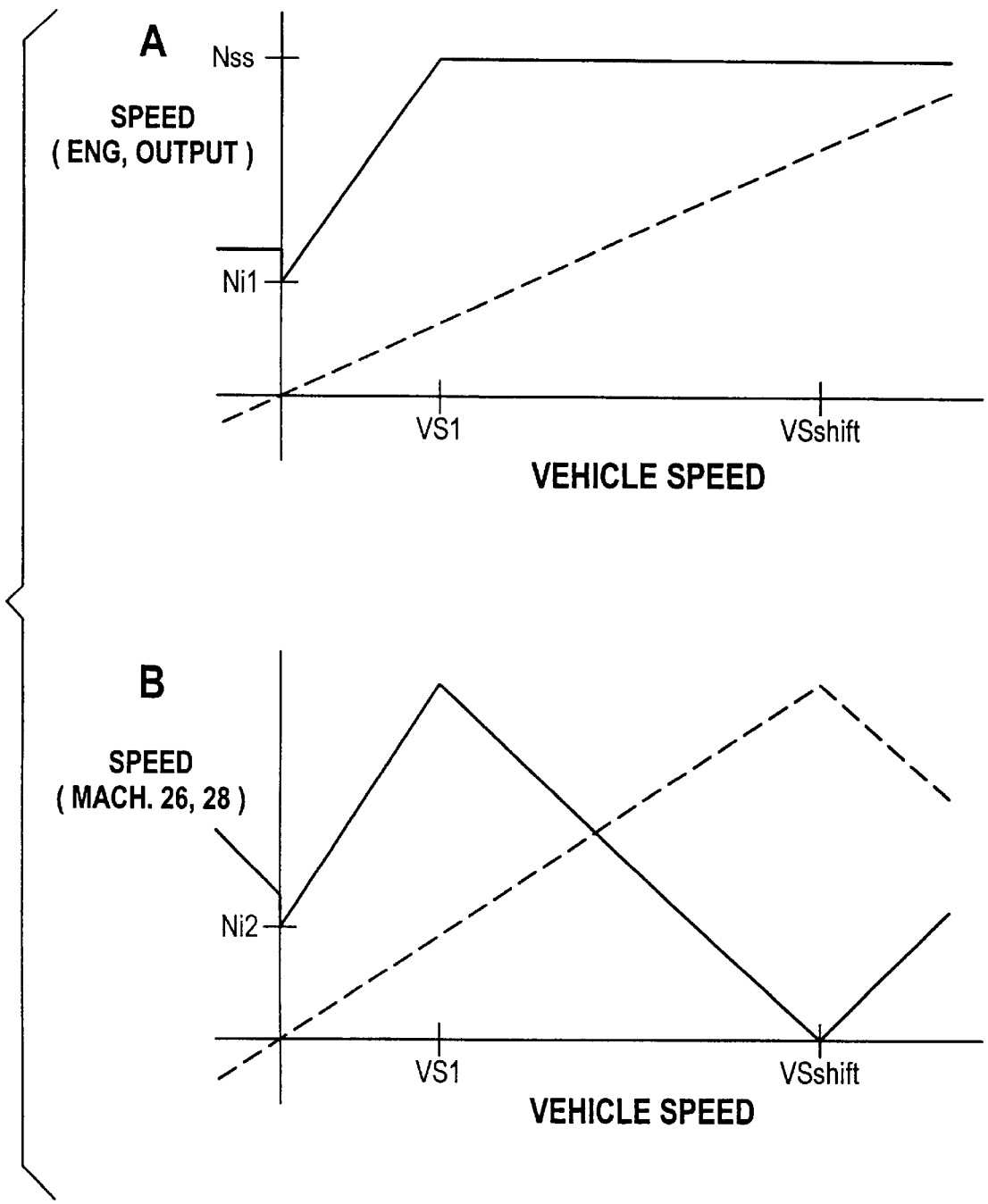
FIG. 2, Graphs A and B, depict the speeds of each electric machine as well as the engine and transmission output shaft relative to the speed of the vehicle obtained by virtue of the transmission depicted in FIG. 1.

The two modes of operation are now described in reference to Graphs A–B of FIG. 2 in the context of a typical full power acceleration. Graph A depicts the speed of engine 14 as a solid trace and the speed of output shafts 20a, 20b as a broken trace, both as a function of vehicle speed. Graph B depicts the speed of machine 28 as a solid trace and the speed of machine 26 as a broken trace, both as a function of vehicle speed. The shift between modes occurs at a vehicle speed identified as VSshift; consequently, clutches 46 and 48 are respectively engaged and disengaged at speeds below VSshift, and respectively disengaged and engaged at speeds above VSshift.

When the vehicle is stationary, the engine 14 idles at idle speed Ni1, and machine 26 is stationary; in this state, the engine 14 drives machine 28 at an idle speed of approximately Ni2. For Reverse operation, the engine speed is raises slightly (causing a corresponding increase in the speed of machine 28), and the machine 26 is motored in a reverse direction. This has the effect of driving transmission output shafts 20a, 20b in reverse and increasing the driven speed of machine 28. For Forward operation, the engine speed is progressively increased to a steady-state running speed Nss for maximum power, and machine 26 is motored in the forward direction as shown. The net effect of engine 14 and machine 26 increases the driven speed of machine 28 as shown, while the transmission output shafts 20a, 20b are driven in the forward direction in direct proportion to the speed of machine 26. At a vehicle speed identified as VS1, the engine 14 reaches its steady-state running speed; thereafter, the driven speed of machine 28 falls at the rate of increase in speed of machine 26, reaching zero speed at the shift speed VSshift. At such point, the speeds of planet carriers 64 and 72 are substantially equal due to the engagement of clutch 46, so that clutch 48 is engaged (and clutch 46 disengaged) with essentially no resulting torque disturbance. Thereafter, the machines 26 and 28 are controlled so that their net effect maintains the rate of increase of transmission output shafts 20a, 20b, with each machine being selectively operated in motoring or generating modes as conditions require.

In summary, the present invention provides an improved input-compound split electromechanical drive configuration having a transverse output for driving a hybrid front wheel drive vehicle, with electric machines 26, 28 disposed on opposite axial ends of the planetary gearset arrangement. An input split mode provides reverse, neutral and low forward ranges, and a compound split mode provides a high speed forward range, with the majority of the power flowing through a single planetary gearset during propulsion drive. The machines 26, 28 are independently controlled, operating in either motoring or generating modes to establish desired power flow conditions among machines 26, 28, engine 14, battery 30 and output shafts 20a, 20b. Also, the second mode configuration allows machines 26 and 28 to equally share the load torque, enabling higher braking effort with significantly reduced machine size and weight. Shifting between the first and second modes occurs synchronously, and at a zero speed of the second machine, contributing to an exceptionally smooth shift.

While the present invention has been described in reference to the illustrated embodiments, it is expected that various modification in addition to those mentioned above will occur to those skilled in the art. For example, the storage battery 30 may be used to assist engine 14 as a means of reducing the engine size and/or improving the powertrain response. Also, the machines 26, 28 may be operated to provide accessory power to the vehicle, to start engine 14, or even to drive the vehicle when engine 14 is not running. Thus, it will be understood that drivetrain configurations incorporating these and other modifications may fall within the scope of this invention, which is defined by the appended claims.

What is claimed is:

1. A two-mode input split hybrid electro-mechanical drivetrain coupled to drive an output shaft, the drivetrain including an engine, first and second electric machines, and first, second and third coupled and co-axially aligned gearsets, the improvement wherein:

the first and second electric machines are co-axially aligned with the gearsets and disposed on opposite axial ends of the gearsets;

the first electric machine is coupled to the first, second and third gearsets, the second electric machine is coupled to the third gearset, the engine is coupled to the first gearset, and the output shaft is coupled to the second gearset;

the first gearset is coupled to the third gearset;

the second gearset has a gear element that is selectively grounded to define a first mode of operation; and the third gearset has a gear element that is selectively coupled to the output shaft to define a second mode of operation.

2. The drivetrain of claim 1, wherein the gear element of the second gearset is released and the gear element of the third gearset is coupled to the output shaft to effect a shift from the first mode of operation to the second mode of operation, and such shift occurs when a speed of the second electric machine is substantially zero.

3. The drivetrain of claim 2, wherein the gear element of the third gearset and the output shaft are rotating in substantial synchronism when the speed of the second electric machine is substantially zero.

4. The drivetrain of claim 1, wherein the drivetrain includes a storage battery, and the first and second electric machines are each selectively operated in motoring and generating modes to control power flow among the engine, the storage battery, the electric machines, and the output shaft.

5. A two-mode input split hybrid electro-mechanical drivetrain coupled to drive an output shaft, comprising:

first, second and third co-axially aligned gearsets, with a mechanical coupling between the first and third gearsets;

the first gearset having gear elements coupled to an engine and a first electric machine;

the second gearset having gear elements coupled to the output shaft and the first electric machine;

the third gearset having gear elements coupled to the first electric machine and a second electric machine;

a first clutch mechanism for selectively grounding a gear element of the second gearset to define a first mode of operation which provides reverse, neutral and low-forward speed ranges; and a second clutch mechanism for selectively coupling the output shaft to a gear element of the third gearset to define a second mode of operation which provides a high-forward speed range.

6. The drivetrain of claim 5, wherein the first clutch mechanism is disengaged and the second clutch mechanism engaged to effect a shift from the first mode of operation to the second mode of operation when a speed of the second electric machine is substantially zero.

7. The drivetrain of claim 6, wherein the gear element of the third gearset and the output shaft are rotating in substantial synchronism when the speed of the second electric machine is substantially zero.

8. The drivetrain of claim 5, wherein the first, second and third gearsets each have a sun gear, a ring gear and a planet carrier, wherein:

the first machine is coupled to the sun gears of the first, second and third gearsets;

the second machine is coupled to the ring gear of the third gearset;

the engine is coupled to the planet carrier of the first gearset; and the output shaft is coupled to the planet carrier of the second gearset.

9. The drivetrain of claim 8, wherein the first clutch mechanism grounds the ring gear of the second gearset during the first mode of operation, and the second clutch mechanism couples the planet carriers of the second and third gearsets during the second mode of operation.

* * * * *